United States Patent [19]

Boriss et al.

[11] 4,004,758
[45] Jan. 25, 1977

[54] METHOD AND APPARATUS FOR PROVIDING DECELERATED AIRCRAFT APPROACH

[75] Inventors: Robert P. Boriss, Holmdel; Thomas F. McNamara, New Shrewsbury, both of N.J.

[73] Assignee: The United States of America as represented by the Secretary of the Army, Washington, D.C.

[22] Filed: Dec. 10, 1975

[21] Appl. No.: 639,552

[52] U.S. Cl. .................. 244/17.13; 235/150.22; 244/185
[51] Int. Cl.² ........................................ G05D 1/12
[58] Field of Search .......... 244/184, 186, 185, 181, 244/188, 187, 17.13; 235/150.22

[56] References Cited

UNITED STATES PATENTS

| 3,361,392 | 1/1968 | Doniger | 244/184 |
|---|---|---|---|
| 3,604,908 | 9/1971 | Loome | 244/187 |
| 3,665,465 | 5/1972 | Miller | 244/188 |
| 3,815,850 | 6/1974 | Tribuno | 244/184 |
| 3,911,436 | 10/1975 | Schanzer | 244/184 |

*Primary Examiner*—Trygve M. Blix
*Assistant Examiner*—Reinhard J. Eisenzopf
*Attorney, Agent, or Firm*—Nathan Edelberg; Jeremiah G. Murray; Michael Zelenka

[57] ABSTRACT

Method and apparatus for providing a helicopter with a decelerated approach towards a landing site. An MLS system provides the aircraft with azimuth, elevation, range and range rate information. The aircraft flies towards the approach path and once it is acquired, the aircraft is decelerated until a predetermined range rate is achieved, typically 40 knots, at which point the aircraft's heading is frozen and further corrections to the aircraft's lateral position are made by exclusive use of lateral roll commands.

6 Claims, 4 Drawing Figures

METHOD AND APPARATUS FOR PROVIDING DECELERATED AIRCRAFT APPROACH

GOVERNMENT LICENSE

The invention described herein may be manufactured and used by or for the Government for governmental purposes without the payment of any royalties thereon or therefor.

BACKGROUND OF THE INVENTION a. Field of the Invention

Broadly speaking, this invention relates to aviation. More particularly, in a preferred embodiment, this invention relates to methods and apparatus for providing a decelerated approach to a landing site, especially for rotary wing aircraft.

b. Discussion of the Prior Art

As is well known, the current technique for helicopter instrument landing approaches using conventional Instrument Landing Systems (ILS) is essentially the same as for fixed wing aircraft. That is, in making approaches to a runway equipped with an ILS, the helicopter pilot merely follows a gentle glideslope (e.g., 2.5 degrees) towards the runway maintaining a constant velocity down to "breakout" or visual acquisition of the ground and approach lighting systems. Only after "going visual" does the helicopter pilot decelerate his aircraft down to a slow taxi speed or hover.

Unfortunately, this approach technique is only useful for approaches to runway environments; such ideal circumstances are, however, seldom found in helicopter operations. Where the desired landing site is a confined area, a clearing in a forest, for example, the nearby presence of tall trees makes the use of a gentle (shallow) glideslope all but impossible and far more severe glideslope angles, for example, 6° to 12°, must be employed. Thus, if the pilot is to make a landing approach to a confined area at night, with no lighting aids, or under conditions of reduced visibility, such as heavy rain, cloud cover or fog, a different approach technique must be adopted. It becomes quite clear that a helicopter pilot simply cannot track a 6° or 12° glidepath angle, break out at 50 feet above the ground while traveling at 60 knots, say, and bleed off the aircraft's forward and vertical speeds while continuing a straight-line approach to the confined touchdown area. While it is true that the invention disclosed herein was developed to lower the landing minima for helicopters during tactical military operations, one skilled in the art will appreciate that the results are equally applicable to civilian operations such as landing a helicopter at a forest-fire base obscured by smoke, at a fog-bound oil exploration field at sea, or at an inner city complex obscured by smog and haze, etc.

SUMMARY OF THE INVENTION

The problem, then, is to devise a technique which will provide a controlled, decelerated helicopter approach to a landing site under conditions of severely reduced visibility. The problem has been solved by the instant invention which, in a preferred embodiment, comprises a method of providing a decelerated approach for an aircraft towards a landing site. The method comprises the steps of transmitting a plurality of radio beams outwardly from the landing site towards the aircraft, the beams having encoded thereon information relative to the aircraft's azimuth, elevation, range and range rate and defining a desired approach path towards the landing site, and decoding the plurality of encoded radio beams, on the aircraft, thereby to derive signals representative of the aircraft's instantaneous azimuth, elevation, range and range rate. The method also includes the steps of correcting the heading of the aircraft, responsive to the signals, to fly the aircraft along a given approach path towards the landing site while simultaneously decelerating the aircraft according to a predetermined deceleration curve thereby to bleed off all forward and vertical velocity, and as the aircraft is proximate the landing site, freezing the heading of the aircraft at a predetermined range rate and then, correcting for further lateral displacement of said aircraft from said approach path by exclusive use of lateral roll commands.

The invention and its mode of operation will be more fully understood from the following detailed description, when taken with the appended drawings in which:

DETAILED DESCRIPTION OF THE INVENTION

Figure 1:
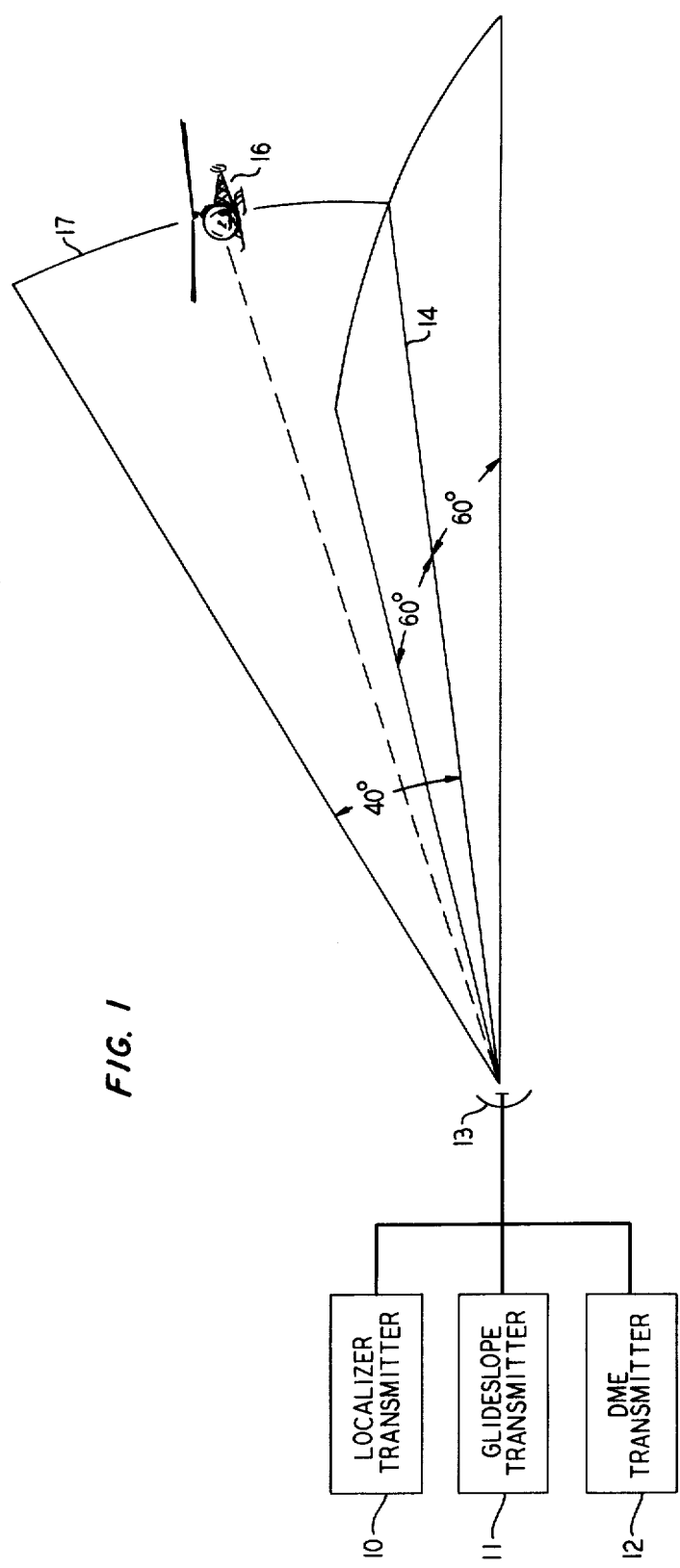
FIG. 1 is an isometric view of an illustrative MLS landing system.

To assist helicopter pilots in IFR approach and landing operations, a new generation of systems known as microwave landing systems has been developed. As shown in FIG. 1, such systems typically comprise a localizer transmitter 10, a glideslope transmitter 11 and a DME transmitter 12 connected to an antenna 13. Actually, each transmitter has its own antenna but to avoid cluttering the drawing only one such antenna is shown.

The localizer antenna sweeps through 360° but the transmitter is gated on only for a 120° angle, that is 60° to the left and 60° to the right of the desired approach path 14 to the landing site. A shaft encoder on the localizer antenna generates a digital signal representative of the instantaneous angular position of the localizer antenna. This digital signal is modulated upon the localizer beam; thus, as helicopter 16 enters the localizer beam, the onboard receiver demodulates the digital signal and displays to the pilot or autopilot the instantaneous azimuth of the aircraft with respect to the desired approach path to the landing site.

In like fashion, the glideslope antenna sweeps through a 45° angle (−5° to +40° with respect to the horizon) and a shaft encoder generates a signal which is modulated upon the glideslope beam 17. Thus, as the glideslope beam passes across the aircraft 16 an onboard receiver indicates to the pilot or autopilot the instantaneous elevation of the aircraft with respect to the landing site. Lastly, a pulsed beam from the aircraft is received at the landing site, delayed, and then retransmitted to the aircraft by DME transmitter 12. This permits an onboard receiver to compute from the net roundtrip delay of the signal both the distance remaining to the landing site and the aircraft's closure rate or range rate toward the landing site.

Figure 2:
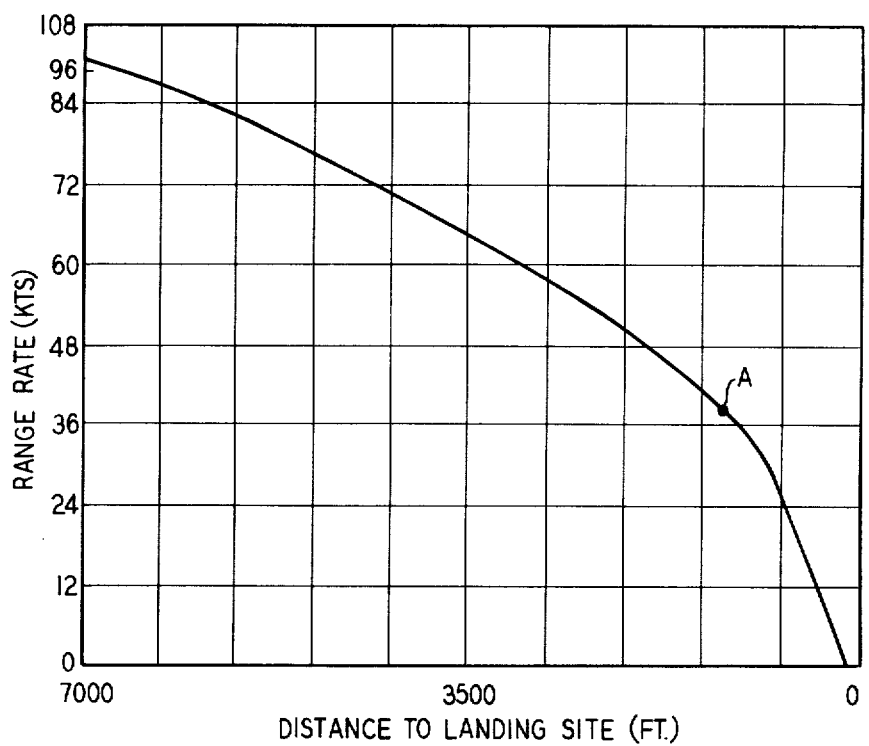
FIG. 2 is a graph depicting the deceleration curve desired for the aircraft.

Since the localizer beam, glideslope beam and DME beam give the aircraft its instantaneous azimuth, glideslope range, and range rate, it would seem, at first blush, that there should be no problem in decelerating the aircraft along the desired approach path until breakout is achieved. However, as shown in FIG. 2, which is a typical deceleration curve, when the aircraft is 7000 feet from touchdown (a little over 1 mile), the aircraft is closing at a range rate of 96 knots but at 350 feet to touchdown the range rate has dropped to only 12 knots, a quite rapid rate of deceleration. This is indeed a difficult task to perform under instrument flight.

Unfortunately, as a helicopter slows it becomes more and more subject to the effects of crosswinds. For example, when the aircraft is traveling at 96 knots, a crosswind of 5 knots, say, will produce a slight but noticeable heading offset which the pilot must maintain if he is to stay on the approach path. When the speed drops to only 45 knots, however, the effect of the crosswind becomes much more severe and even greater heading correction is required and, in the limit, as the airspeed falls to zero the pilot must make a heading correction of as much as 90° to the desired course to maintain the aircraft's position on the localizer centerline.

These large inbound leading misalignments cause two highly undesirable effects. The first of these is that when the transition from instrument to visual control takes place, i.e., at "breakout," the intended landing site is not "in front" of the aircraft where the pilot expects to see it, but as much as 90° off to one side. Accordingly, precious time must be spent, at a most critical point in the approach, for the pilot to orient himself as to the aircraft's position, altitude and velocity with respect to the landing zone. The second adverse effect is that when the aircraft's heading is grossly misaligned with the inbound course the lateral and longitudinal control axes become cross-coupled, e.g., a lateral command input causes the aircraft to displace longitudinally as well as laterally with respect to the ground based MLS reference system. Of course, all of this creates a considerable degree of disorientation for the pilot and tends to render conventional instrument display systems unflyable.

According to the invention, to overcome this deficiency, instrumentation is provided in the aircraft which freezes the aircraft's heading to the inbound course at a given airspeed, typically 40 knots - point A on FIG. 2, and then tracks the localizer beam using only lateral roll commands. This, in effect, causes the helicopter to "slip" to the left or to the right to correct for lateral displacement errors. Advantageously, this technique is employed in a flight director system which provides a fourth guidance command or "cue" to enable the pilot to maintain the proper heading alignment during landing.

The above technique has application to both military and civilian operations where decelerated approaches are required due to confined landing sites. The technique is most effectively incorporated into the newer helicopter flight director systems used by both military and civilian users. However, this technique can also be implemented with conventional instrument approach displays which use raw data, e.g., the course deviation indicator (CDI) and the remote magnetic indicator (RMI) which are standard in almost all military and civilian IFR equipped helicopters.

Figure 3:
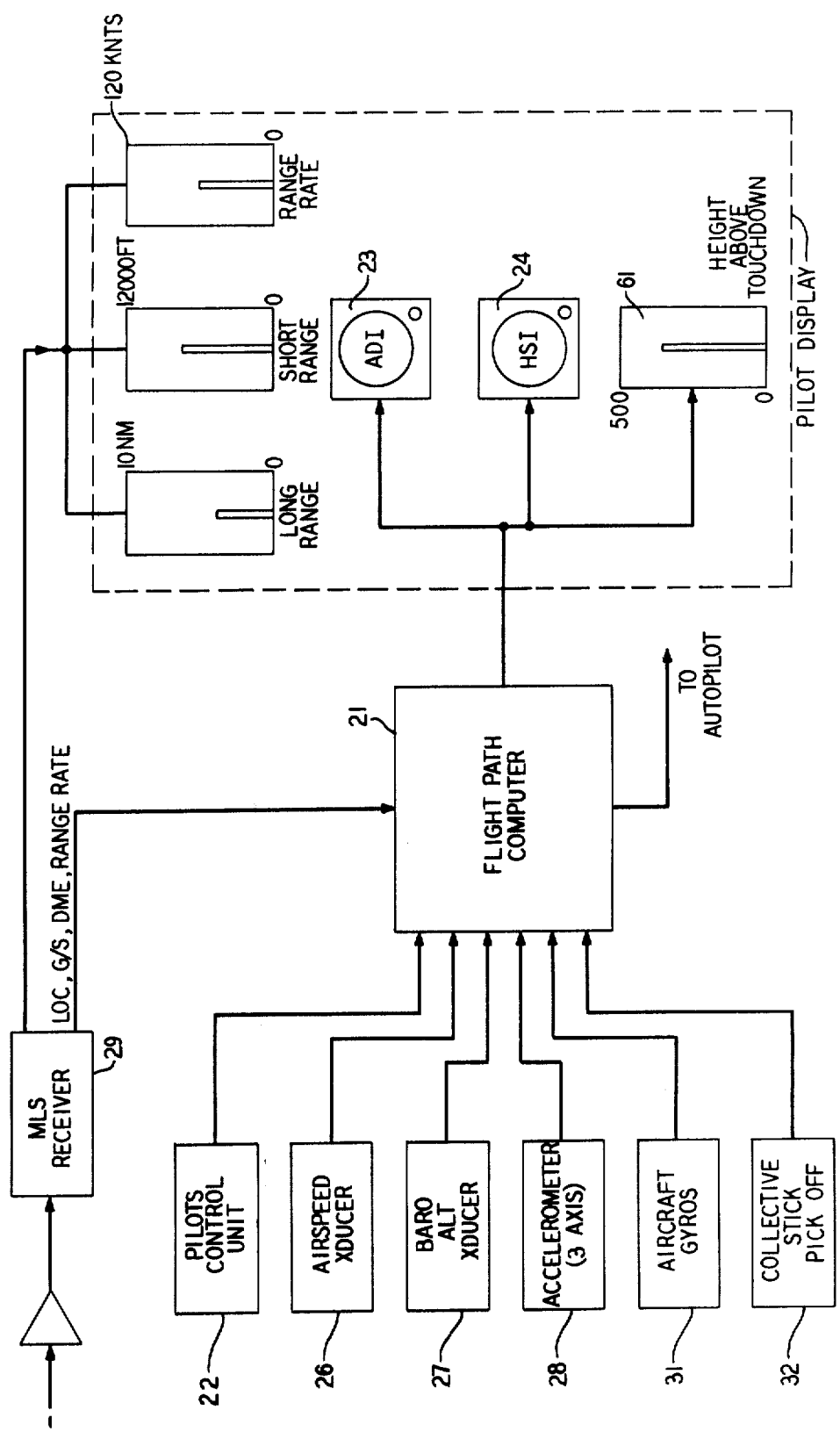
FIG. 3 is a block schematic drawing of an illustrative equipment configuration for flying the deceleration curve shown in FIG. 2.

According to the invention, the above-described MLS system is integrated with a flight director and a four-axis autopilot system. The four cue flight director system was developed specifically for helicopter use and, as shown in FIG. 3, is composed of a flight path computer 21, a pilot control unit 22, an electromechanical Attitude Director Indicator (ADI) 23 and a Horizontal Situation Indicator (HSI) 24. Airspeed and barometric altitude transducers 26 and 27 are also provided for the airspeed hold and altitude hold modes which are available within the director. The system also uses a 3 axis inertial accelerometer package 28 to supplement the rate information derived from the MLS receiver 29 guidance signals.

In the approach and landing mode, the flight path computer 21 accepts signals from the MLS landing system receiver 29, the accelerometer unit 28, the aircraft's gyro systems 31 and a collective stick-motion pickup unit 32 and generates the required signals to drive the pilots indicators.

Figure 4:
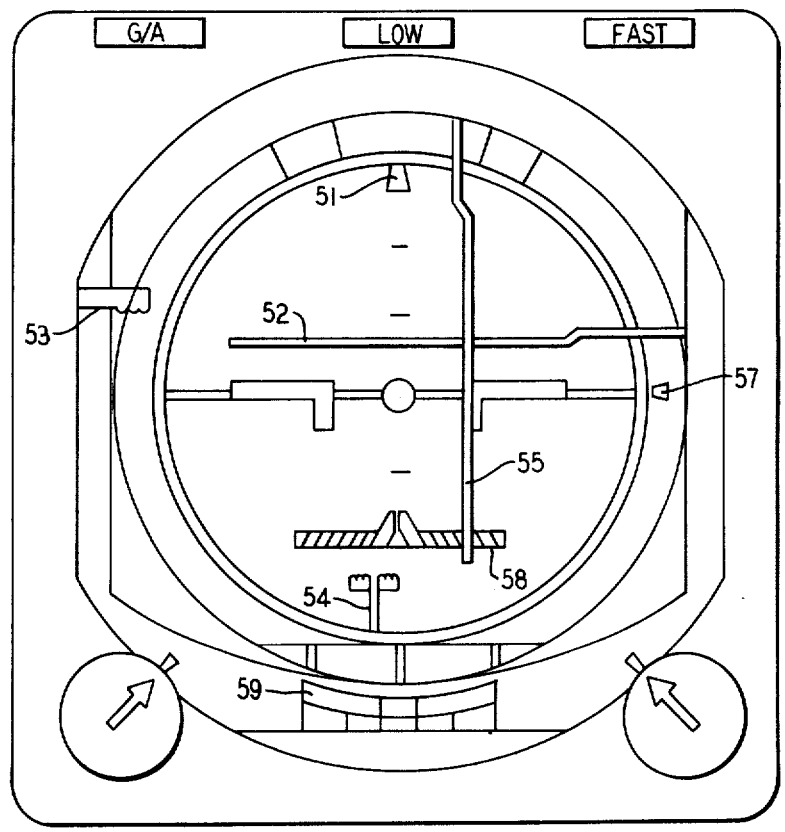
FIG. 4 is a plan view of an attitude director indicator for use with the equipment shown in FIG. 3.

The ADI, as shown in FIG. 4, is the heart of the pilot's display group. All "command" information is displayed via this indicator. The center vertical command bar 51 provides the localizer/steering command, the horizontal command bar 52 provides the aircraft speed/pitch command, the left hand bar 53 provides the glideslope/collective command, and the pedal symbol 54 provides the heading/pedal command. Hence the pilot is provided with four commands or "cues" which indicate the required control actions for the four basic helicopter controls at his disposal (throttle is automatically controlled via the engine governor in turbine engines). In addition to this command information, the ADI contains a glideslope deviation bar 57, center right; a height above touchdown bar 58, just below center; and a needle and ball indicator 59, bottom center. The command information is of a zero readout type, i.e., when the pilot has made the correct and sufficient control response, the appropriate bar will move to its neutral or center position. Thus, although the aircraft may not be on the desired approach path, the command information indicates to the pilot that the aircraft is properly intercepting the desired path.

The HSI (FIG. 3) provides aircraft position and orientation to the pilot. The HSI depicts the aircraft's magnetic heading, its angular orientation with respect to the localizer course (vertical bar), and its displacement from the glideslope (horizontal bar). System failure status is shown via flag indicators on both the ADI and HSI displays.

Additional approach status information is provided to the pilot via the four tape indicators shown in FIG. 3. These indicators are: height above touchdown 61, calibrated from 0 to 500 feet, short range DME calibrated from 0 to 12,000 feet, long range DME, calibrated from 0 to 10 nautical miles and range rate calibrated from 0 to 120 knots. Lights positioned immediately below the tapes provide flag indications.

In operation, the present system is mechanized such that deceleration is initiated at a range of 7000 feet and follows the profile shown in FIG. 2. Positive commands, as displayed by the ADI, are followed by the pilot using normal control techniques down to a range rate of 40 knots (Point A). At this point, the pedal command no longer provides for coordinated flight, but instead directs the pilot to align the aircraft's heading with the localizer course. Thus, localizer tracking, which is accomplished via lateral displacement of the cyclic stick, now causes the aircraft to "slip" to the left or right in order to track the localizer course. As previously discussed, without this pedal command mechanization, the aircraft's nose, during cross wind decelerations to hover, would tend to turn into the wind causing large heading misalignments with respect to the localizer center line. This misalignment leads to pilot disorientation and a mixing of lateral and longitudinal control axes. The performance of the system disclosed and claimed herein enables manual and fully-coupled instrument approaches to a 10 foot hover.

Thus, when bar 57 of the ADI is on the center, the pilot is either on course or on the right path to get on course.

One skilled in the art may make various changes and substitutions to the layout of parts shown without departing from the spirit and scope of the invention.

What is claimed is:

1. A method of providing a decelerated approach for a rotary winged aircraft towards a landing site, wherein it is assured the heading of the aircraft at breakout corresponds to the inbound course, which comprises:
   transmitting a plurality of radio beams outwardly from said landing site towards said aircraft, said beams having encoded thereon information relative to said aircraft's azimuth, elevation, range and range rate and defining a desired approach path towards said landing site;
   decoding said plurality of encoded radio beams, on said aircraft, thereby to derive signals representative of the aircraft's instantaneous azimuth, elevation, range and range rate;
   correcting the heading of said aircraft, responsive to said signals, to fly said aircraft along said approach path towards the landing site, while simultaneously;
   decelerating said aircraft according to a predetermined deceleration curve thereby to bleed off all forward and vertical velocity as said aircraft approaches said landing site;
   freezing the heading of said aircraft to the inbound course at a predetermined range rate prior to breakout and then
   correcting for further lateral displacement of said aircraft from said approach path by exclusive use of lateral roll commands.

2. The method according to claim 1 wherein said lateral displacement correcting step comprises:
   visually displaying the deviation of said aircraft's heading from said approach path heading (course); and
   after said heading has been frozen to the course heading, coupling said lateral roll commands into said visual display whereby the pilot of said aircraft manually corrects for any displacement by centering said visual display.

3. Apparatus for providing a decelerated approach for a rotary winged aircraft towards a landing site, wherein it is assured the heading of the aircraft at breakout corresponds to the inbound course which comprises:
   means for transmitting a plurality of radio beams from said landing site towards said aircraft, said radio beams respectively having encoded thereon information relative to the azimuth, elevation and range of said aircraft;
   means, upon said aircraft, for decoding said radio beams thereby to derive signals representative of the instantaneous azimuth, elevation, range and range rate of said aircraft;
   means, responsive to said signals, for altering the heading of said aircraft towards an approach path defined by said azimuth and elevation beams;
   means, responsive to said range and range rate signals, for decelerating said aircraft as it flies along said approach path;
   means, responsive to a signal representative of a predetermined range-rate, for freezing the heading of said aircraft to the inbound course prior to breakout; and
   means for thereafter correcting the error between the desired and actual lateral flight path of said aircraft by means of lateral roll commands.

4. The apparatus according to claim 3 wherein said heading altering means comprises:
   a flight computer;
   means for supplying signals to said computer representative of said aircraft's azimuth, elevation, range and range rate;
   means for supplying signals to said aircraft representative of said aircraft's acceleration, airspeed and altitude;
   means for supplying signals to said computer representative of the instantaneous position of the controls of said aircraft; and
   means, responsive to the output of said computer, for flying said aircraft towards said approach path.

5. The apparatus according to claim 4 wherein said flying means comprises:
   means for visually displaying the difference between the actual and desired position and heading orientation of said aircraft.

6. The apparatus according to claim 4 wherein said flying means comprises:
   an autopilot connected to the flight controls of said aircraft; and
   means for coupling the output of said computer to said autopilot.

* * * * *